(12) United States Patent
Genssle et al.

(10) Patent No.: US 8,915,645 B2
(45) Date of Patent: Dec. 23, 2014

(54) METHOD AND DEVICE FOR MONITORING A COMPONENT ARRANGED IN AN EXHAUST REGION OF AN INTERNAL COMBUSTION ENGINE

(75) Inventors: Andreas Genssle, Musberg (DE); Enno Baars, Leonberg (DE); Markus Eitel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 13/320,436

(22) PCT Filed: Apr. 21, 2010

(86) PCT No.: PCT/EP2010/055268
§ 371 (c)(1),
(2), (4) Date: Feb. 1, 2012

(87) PCT Pub. No.: WO2010/130539
PCT Pub. Date: Nov. 18, 2010

(65) Prior Publication Data
US 2012/0120981 A1    May 17, 2012

(30) Foreign Application Priority Data
May 14, 2009   (DE) .......................... 10 2009 003 091

(51) Int. Cl.
*G01K 15/00*    (2006.01)
(Continued)

(52) U.S. Cl.
CPC .......... *F01N 11/002* (2013.01); *F02D 41/1441* (2013.01); *F02D 41/1446* (2013.01);
(Continued)

(58) Field of Classification Search
CPC ........................... F02D 41/1466; F02D 41/222

USPC ............................................................ 374/1
See application file for complete search history.

(56) References Cited

U.S. PATENT DOCUMENTS 6,405,122 B1 *   6/2002   Yamaguchi .................... 701/106
6,634,210 B1 *   10/2003   Bosch et al. .................. 73/23.33
(Continued)

FOREIGN PATENT DOCUMENTS

CN              101163962              4/2008
(Continued)

OTHER PUBLICATIONS

PCT/EP2010/055268 International Search Report dated Jun. 9, 2010 (3 pages).

*Primary Examiner* — Lisa Caputo
*Assistant Examiner* — Nasir U Ahmed
(74) *Attorney, Agent, or Firm* — Michael Best & Friedrich LLP

(57) ABSTRACT

The invention relates to a method for monitoring a sensor unit (20) that is arranged in the exhaust gas region of an internal combustion engine (10). According to the invention, a sensor temperature (31, 32) is directly or indirectly determined by the sensor unit (20), and is compared to an exhaust temperature (33) that is determined by a further sensor unit and/or to model variables and/or to defined threshold values, whereby a dismounting and/or an inappropriate mounting of the sensor unit is indicated. The invention further relates to a device for monitoring a sensor unit (20) arranged in an exhaust region of an internal combustion engine (10), the sensor unit being used to directly or indirectly determine a sensor temperature (31, 32) which can be compared to an exhaust temperature (33) that is determined by a further sensor unit and/or to model variables and/or to defined threshold values in an engine control unit (14), wherein a malfunction entry and/or a warning signal can be derived from said comparison.

20 Claims, 2 Drawing Sheets

(51) Int. Cl.
    *F02D 41/14*          (2006.01)
    *F02D 41/22*          (2006.01)
    *F01N 11/00*          (2006.01)
    *F02D 41/02*          (2006.01)

(52) U.S. Cl.
    CPC ........... *F02D 41/221* (2013.01); *F01N 2550/00* (2013.01); *F01N 2560/00* (2013.01); *F01N 2560/20* (2013.01); *F02D 41/029* (2013.01); *F02D 41/1444* (2013.01); *F02D 41/222* (2013.01); *Y02T 10/40* (2013.01); *Y02T 10/47* (2013.01)
    USPC .......................................... 374/1; 73/114.69

(56) References Cited

U.S. PATENT DOCUMENTS

| | | | |
|---|---|---|---|
| 7,337,607 B2 * | 3/2008 | Hou et al. | 60/274 |
| 2003/0196499 A1 * | 10/2003 | Bosch et al. | 73/865.5 |
| 2004/0129065 A1 | 7/2004 | Plote et al. | |
| 2005/0102076 A1 * | 5/2005 | Kariya et al. | 701/34 |
| 2005/0143897 A1 | 6/2005 | Ripper et al. | |
| 2007/0010020 A1 * | 1/2007 | Elfvik et al. | 436/37 |
| 2008/0053067 A1 * | 3/2008 | Schmidt et al. | 60/276 |
| 2009/0013665 A1 * | 1/2009 | Brahma | 60/276 |
| 2009/0013758 A1 * | 1/2009 | Baumann et al. | 73/23.33 |
| 2009/0090622 A1 * | 4/2009 | Ripley | 204/401 |
| 2010/0235141 A1 * | 9/2010 | Wang et al. | 702/183 |

FOREIGN PATENT DOCUMENTS

| | | |
|---|---|---|
| CN | 101403328 | 4/2009 |
| DE | 10331334 | 2/2005 |
| DE | 10358195 | 7/2005 |
| WO | 0135065 | 5/2001 |
| WO | 2004003355 | 1/2004 |
| WO | 2006110071 | 10/2006 |

* cited by examiner

METHOD AND DEVICE FOR MONITORING A COMPONENT ARRANGED IN AN EXHAUST REGION OF AN INTERNAL COMBUSTION ENGINE

BACKGROUND OF THE INVENTION

The invention relates to a method for monitoring a sensor unit arranged in an exhaust region of an internal combustion engine.

The invention further relates to a corresponding device for performing the method.

In order to comply with the statutory limits for emissions from internal combustion engines, various components are used for exhaust gas aftertreatment and sensor units are used to control these systems and to monitor the emissions. Known components for exhaust gas aftertreatment are oxidation catalytic converters, diesel particle filters (DPF), SCR catalytic converters and $NO_x$ catalytic converters, for example. Corresponding sensor systems are lambda probes, $NO_x$ sensors or particle sensors, for example.

On the basis of statutory provisions currently at the planning stage, for example, the discharge of particulates from an internal combustion engine, in particular a diesel engine, must be monitored upstream and/or downstream of the diesel particle filter (DPF), whilst in operating service. A load prognosis of the diesel particle filter for regeneration monitoring is furthermore required in order to achieve a high system reliability and in order to allow the use of cost-effective filter materials. Provision may furthermore be made for regulating the combustion characteristics of the internal combustion engine on the basis of the information on discharge of particulates.

Under new legislation the monitoring of these components and sensor units for malfunction and unauthorized removal is also to be ensured. This is to be reliably ensured in the context of a so-called on-board diagnosis (OBD).

DE 103 58 195 A1, for example, a method for monitoring a component arranged in an exhaust region of an internal combustion engine, in which a measurement for a first exhaust gas temperature is taken upstream of the component, and in which a second exhaust gas temperature, which occurs downstream of the component, is measured by a second temperature sensor. The intention here is to monitor the low-pass behavior, which is determined by the heat capacity of the component, by evaluating the first exhaust gas temperature in relation to the second exhaust gas temperature and to emit a fault signal in the event of a variation in a predefined measurement for the low-pass behavior of the component.

With this method it is possible to assess the state of the component, which is situated between the two temperature sensors in the direction of flow of the exhaust gas. Thus it is also possible, for example, to detect inadmissible tampering with this component right through to complete removal of the component.

It is not possible to detect, however, whether the sensor unit itself, for example the particle sensor, has been tampered with or even inadmissibly removed.

SUMMARY OF THE INVENTION

An object of the invention is therefore to provide a method which will serve to monitor and reliably indicate any unauthorized removal of the sensor unit from the exhaust tract of internal combustion engines.

A further object of the invention is to provide a corresponding device for performing the method.

In this method a sensor temperature is determined directly or indirectly by the sensor unit and from a comparison of the directly or indirectly determined sensor temperature with an exhaust gas temperature, determined by means of a further sensor unit, and/or with modeled variables and/or with defined threshold values a removal and/or functionally incorrect installation of the sensor unit is identified.

The object is achieved in respect of the device in that the sensor unit is able directly or indirectly to determine a sensor temperature, which in an engine control can be compared with an exhaust gas temperature, determined by means of a further sensor unit, and/or with modeled variables and/or with defined threshold values, and from the comparison a fault entry and/or a warning signal can be derived.

With the method demonstrated and the device for performing this method it is possible to detect structural modifications or damage in the area of the exhaust region of the internal combustion engine. In contrast to the state of the art cited above, it is thereby possible, in the context of an expanded on-board diagnosis (OBD), to reliably detect malfunctions or even an unauthorized removal of the sensor unit. Moreover, it is also possible to detect structural modifications or defects of the exhaust system upstream of the sensor unit. Thus, it is possible, for example, to detect any removal of individual components of an exhaust gas aftertreatment system or holes in the exhaust tract, since the heat accumulation behavior of the system and the incident flow response of the sensor unit will vary, giving rise to a modified temperature profile compared to temperature profile values determined by modeling, which modified profile can be detected and displayed as a deviation.

In a variant of the method according to the invention the absolute sensor temperature of the sensor unit is continuously compared with the exhaust gas temperature. If this gives rise to larger deviations, for example, these can be detected by means of corresponding comparators. In the same way corresponding comparisons with modeled values stored in a characteristics map are also possible. Here the exhaust gas temperature may be derived from measured values already available or from modeled values in an engine control unit.

It may also be advantageous, however, if variables derived from the absolute temperature profile of the sensor unit are continuously compared with correspondingly derived variables of the exhaust gas temperature. It is thus possible, for example, to compare sliding averages or time-related derivations of the temperature profiles with one another and to compare the sensor temperature profile with stored values. Beside the diagnosis, such mathematical operations may serve, for example, to eliminate transient disturbances in the signal profile, if a sliding average is determined, for example. False alarms can thereby be avoided.

A further example of the method relates to a comparison of a gradient of the temperature profile of the sensor unit with a gradient of the profile of the exhaust gas temperature. This affords advantages particularly if the dynamics of the signal profiles are being evaluated.

In a further method the dynamic temperature profile of the sensor unit when the sensor unit is heated is evaluated in relation to a modeled variable for the sensor unit when heated. This relies on the fact that in the case of a sensor unit which has been removed without authorization or incorrectly installed, a temperature profile significantly different from a correctly installed sensor unit is recorded.

Provision may be made here, for example, to evaluate a heat output necessary to adjust a set-point temperature, allowing for an exhaust gas mass flow and the exhaust gas temperature. If an insufficient heat output is detected, for example, this may be indicative of a removal of the sensor unit.

In further variants of the method the evaluation is performed periodically at specific time intervals, for example during a regeneration of the diesel particle filter (DPF) in the case of a diesel internal combustion engine, and/or in specific operating states of the internal combustion engine, for example in overrun conditions of the internal combustion engine. This is advantageous, since here known or relatively constant operating conditions prevail and extraneous disturbance variables are easily recognized or are present only to a minor extent.

An especially precise temperature measuring device can be achieved if the sensor unit comprises a temperature sensor in the form of a platinum meander, since temperature sensors of this type have a virtually linear resistance-temperature characteristic curve, which can be evaluated with a simple electronic circuitry outlay. In other exemplary embodiments metal alloys may also be used as temperature sensors, which have a different resistance characteristic.

In a further preferred embodiment the sensor unit may comprise a heating element. Here the temperature of the sensor unit may be determined indirectly, for example, from the necessary heat output, allowing for the exhaust gas mass flow and the exhaust gas temperature.

In an especially preferred embodiment the sensor unit is embodied as a particle sensor. This may already contain a temperature sensor and/or a heating element for determining the temperature directly or indirectly. Particle sensors meanwhile constitute important monitoring sensors in the exhaust system of a diesel internal combustion engine.

A preferred application of the variants of the method, as have previously been described, is on-board diagnosis in a diesel internal combustion engine. In this application what matters in particular is that the particle sensor is fitted correctly and has not been inadmissibly removed. This can be reliably detected by the diagnostic method outlined. It is thereby ensured that a precise and reproducible diagnosis of the particulate emissions from a soot particle filter (DPF) arranged in the exhaust tract of the diesel internal combustion engine is detected and is monitored in the context of the on-board diagnosis.

Here the working principle of the method can be incorporated into an engine control as a software and/or hardware-based solution. In the case of diesel engines this may be incorporated, in particular, in an electronic diesel control (EDC).

The method according to the invention may also be used with lambda probes or $NO_x$ sensors as sensor units.

BRIEF DESCRIPTION OF THE DRAWINGS

The invention will be explained in more detail below with reference to an exemplary embodiment represented in the figures, of which.

DETAILED DESCRIPTION

Figure 1:
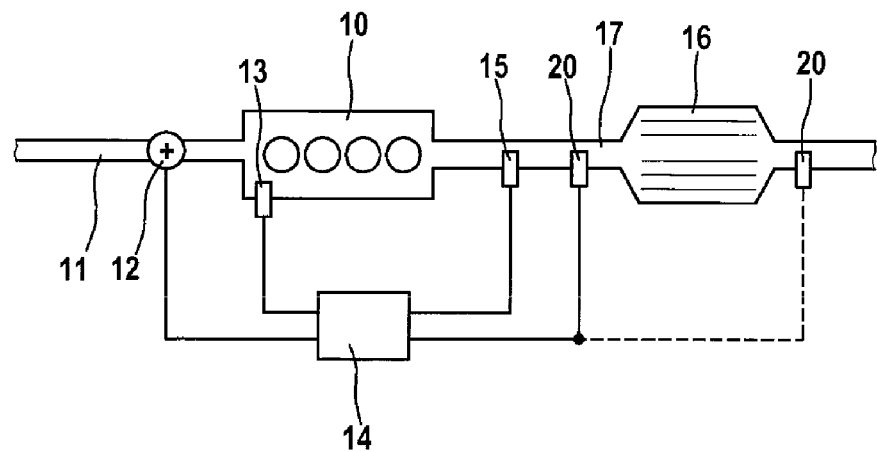
FIG. 1 in a schematic representation shows the technical environment in which the method can be applied, FIG. 2 schematically in top view shows a sensor unit embodied as a particle sensor, FIG. 3 in a schematic representation shows a side view of a particle sensor.

FIG. 1 as an example schematically shows the technical environment in which the method according to the invention can be applied. The technical environment may furthermore also comprise exhaust gas aftertreatment devices, which comprise measures to reduce at least one further statutorily limited constituent, such as $NO_x$ reducing measures, for example.

An internal combustion engine 10, which may be embodied as a diesel engine, is supplied with combustion air via an air feed inlet 11. Here the quantity of combustion air can be determined by means of an air mass flow sensor 12 in the air feed inlet 11. The quantity of air can be used in the event of a correction to an accumulation probability of particles present in the exhaust gas from the internal combustion engine 10. The exhaust gas from the internal combustion engine 10 is discharged via an exhaust tract 17, in which an exhaust emission control system 16 is arranged. This exhaust emission control system 16 may be embodied as a diesel particle filter. Also arranged in the exhaust tract 17 in the example shown are an exhaust gas probe 15 embodied as a lambda probe and a sensor unit 20 embodied as a particle sensor, the signals from which are fed to an engine control 14. The engine control 14 is furthermore connected to the air mass flow sensor 12 and on the basis of the data fed to it determines a quantity of fuel, which can be delivered via a fuel metering unit 13 of the internal combustion engine 10. Here the sensor unit 20 may also be arranged downstream of the exhaust emission control system 16 in the direction of flow of the exhaust gas. The devices shown make it possible to monitor the discharge of particulates from the internal combustion engine 10 (on-board diagnosis) and to predict the load on the exhaust emission control system 16 embodied as a diesel particle filter (DPF).

Figure 2:
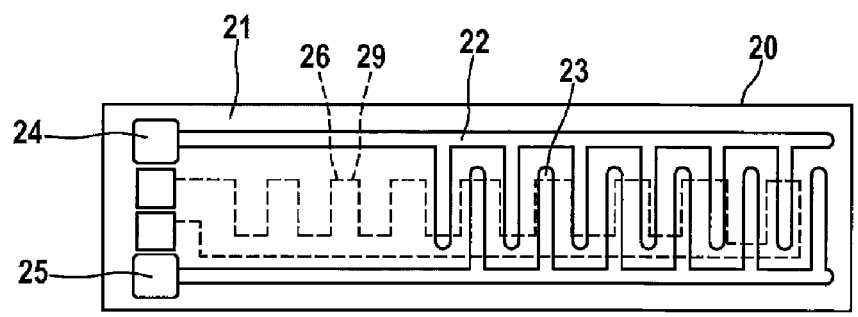

FIG. 2 in a schematic representation shows a top view of a sensor unit 20 embodied as a particle sensor corresponding to the state of the art.

A first electrode 22 and a second electrode 23 are imposed on an insulating substrate 21, composed of aluminum oxide, for example. The electrodes 22, 23 take the form of two interdigital, intermeshing comb electrodes. A first terminal 24 and a second terminal 25, via which the electrodes can be connected to a control unit (not shown) for the voltage supply and for performing the measurement, are provided at the end faces of the electrodes 22, 23. In addition the sensor unit 20 comprises a temperature sensor 29, which serves for directly determining a sensor temperature 31, 32. The temperature sensor 29 may take the form of a platinum meander, additional electrodes serving to determine a temperature-dependent resistance, which can be evaluated in the engine control 14.

Figure 3:
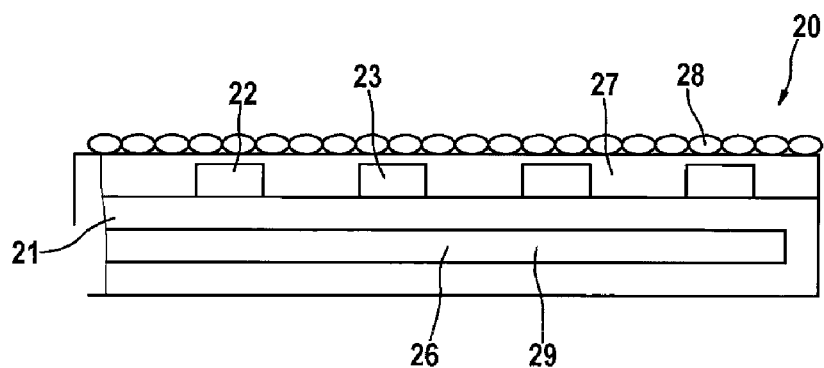

FIG. 3 in a schematic representation shows a side view of a detail of the particle sensor 20.

In addition to the components already shown in FIG. 2, a heating element 26, which is integrated in the substrate 21, and an optional protective layer 27 and a layer of particles 28 are also represented in the side view. Here the heating element 26 may be simultaneously embodied as a temperature sensor 29, or the heating element 26 and the temperature sensor 29 may be embodied as separate electrical conductors having separate electrodes.

The operating principle of such particle sensors is already sufficiently described in the literature and will therefore only be described briefly below.

If such a sensor unit 20 is operated in a gas flow carrying particles 28, for example in an exhaust duct of a diesel engine, particles 28 from the gas flow will be deposited on the sensor unit 20. In the case of the diesel engine, the particles 28 are soot particles having a corresponding electrical conductivity. Here the rate at which the particles 28 are deposited on the sensor unit 20 will depend not only on the particle concentration in the exhaust gas but, among other things, also on the voltage which is applied to the electrodes 22, 23. The applied voltage generates an electrical field, which exerts a corresponding attraction on electrically charged particles 28 and on particles 28 having a dipole charge. Through suitable selection of the voltage applied to the electrodes 22, 23 it is therefore possible to influence the rate of deposition of the particles 28.

In the exemplary embodiment the electrodes 22, 23 and the substrate 21 are coated on the electrode side with a protective layer 27. The optional protective layer 27 protects the electrodes 22, 23 against corrosion at the high operating temperatures of the sensor unit 20 generally prevailing. In this exemplary embodiment it is made from a material having a low conductivity, but it may also be produced from an insulating material.

Particles 28 from the gas flow have been deposited in the form of a layer on the protective layer 27. Due to the low conductivity of the protective layer 27, the particles 28 form a conductive path between the electrodes 22, 23, so that depending on the quantity of particles 28 deposited a variation in the resistance occurs between the electrodes 22, 23. This can be measured, for example, by applying a constant voltage to the terminals 24, 25 of the electrodes 22, 23 and determining the variation in the current due to the accumulated particles 28.

If the protective layer 27 is of insulating construction, the deposited particles 28 lead to a variation in the electrical resistance of the sensor unit 20, which can be evaluated by a corresponding measurement, preferably with a d-c voltage.

In the diagnostic method according to the invention a sensor temperature is determined directly or indirectly by the sensor unit and from a comparison of the directly or indirectly determined sensor temperature with an exhaust gas temperature, determined by means of a further sensor unit, and/or with modeled variables and/or with defined threshold values a removal and/or functionally incorrect installation of the sensor unit is identified. The working principle of the method according to the invention with the variants described above can here be implemented to particular advantage as software in the engine control 14 of the internal combustion engine 10, in diesel internal combustion engines in the electronic diesel control (EDC).

Figure 4:
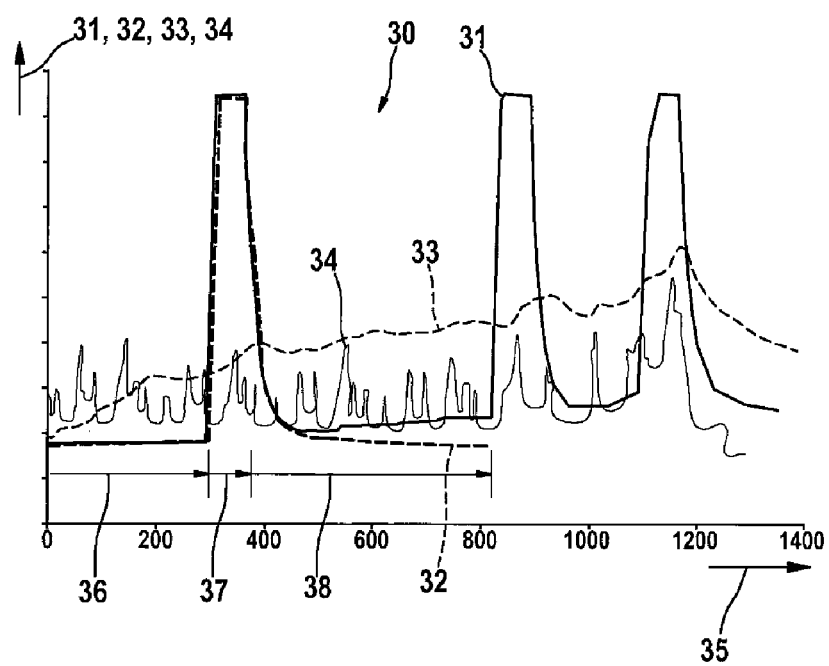
FIG. 4 shows a profile diagram for an exhaust gas mass flow, an exhaust gas temperature and a particle sensor temperature.

Thus FIG. 4, for example, in a profile diagram 30, represents an exhaust gas mass flow 34 and the temperature profiles of the sensor temperature 31, 32 of a sensor unit 20, arranged downstream of the exhaust emission control system 16 designed as a diesel particle filter (DPF), as a function of the time 35, the sensor unit 20 being embodied as a particle sensor. Also shown is an exhaust gas temperature 33. Here the time profile of the sensor temperature 31 shows the temperature profile for a particle sensor, which is correctly installed in the exhaust tract 17 of the internal combustion engine 10. By contrast the time profile of the sensor temperature 32 is obtained if the particle sensor is removed or incorrectly installed.

In a drying/protection phase 36 the sensor unit 20 is first dried by means of an active energizing of the heating element 26 of the sensor unit 20, until a dew point end is reached. This is followed chronologically by a regeneration phase 37, in which accumulated soot is burned off. In this phase the sensor temperature 31, 32 increases sharply. In this phase a diagnosis can be performed allowing for the heat output.

Thereafter the heating element 26 is de-energized during a phase for accumulation of the soot particles 38, in which the diagnosis is performed on the basis of the method of evaluation, such as gradient comparisons or comparisons of the profile dynamics of the sensor temperature 31 of a correctly installed sensor unit 20 and the sensor temperature 32 of a removed or incorrectly installed sensor unit 20. Thus in this phase for accumulation of the soot particles 38 the sensor temperature 31 of a correctly installed sensor unit 20 rises slightly again according to the increasing exhaust gas temperature 33 and is at the same time slightly modulated according to the profile of the exhaust gas mass flow 34, which may be supported through simultaneous evaluation of the exhaust gas mass flow 34. On the other hand, the sensor temperature 32 of a removed or incorrectly installed sensor unit 20 falls and remains at a low level, until active heating ensues.

Using the method demonstrated and the device for performing this method it is possible to detect structural modifications or damage in the area of the exhaust region of the internal combustion engine. In particular it is thereby possible in the context of an expanded on-board diagnosis (OBD) to detect malfunctions reliably or even an unauthorized removal of the sensor unit.

An especially advantageous application of the method according to the invention and use of the corresponding device is an on-board diagnosis of a particle sensor in the exhaust region of a diesel internal combustion engine.

The invention claimed is:

1. A method for monitoring a particulate sensor unit arranged in an exhaust region of an internal combustion engine, the method comprising:
   determining an internal temperature of the particulate sensor unit by a temperature sensor located inside the particulate sensor unit;
   comparing the determined internal temperature of the particulate sensor unit with an exhaust gas temperature; and
   identifying that the particulate sensor unit is not present or incorrectly installed based on a difference between the determined internal temperature of the particulate sensor unit and the exhaust gas temperature using at least one of a further sensor unit, modeled variables, and defined threshold values,
   wherein the particulate sensor unit monitors the discharges of particulates from the internal combustion engine.

2. The method as claimed in claim 1, characterized in that the determined internal temperature of the particulate sensor unit is continuously compared with the exhaust gas temperature.

3. The method as claimed in claim 1, characterized in that variables derived from a temperature profile of the sensor unit are continuously compared with correspondingly derived variables of the exhaust gas temperature.

4. The method as claimed in claim 3, characterized in that a gradient of the temperature profile of the particulate sensor unit is compared with a gradient of the profile of the exhaust gas temperature.

5. The method as claimed in claim 1, characterized in that a dynamic temperature profile of the particulate sensor unit when the particulate sensor unit is heated is evaluated in relation to a modeled variable for the sensor unit when heated.

6. The method as claimed in claim 1, characterized in that a heat output necessary to adjust a set-point temperature is evaluated, allowing for an exhaust gas mass flow and the exhaust gas temperature.

7. The method as claimed in claim 1, characterized in that the evaluation is performed periodically at specific time intervals.

8. The method as claimed in claim 1, characterized in that the particulate sensor unit is identified as not present or incorrectly installed based on the modeled variables.

9. The method as claimed in claim 1, characterized in that the particulate sensor unit is identified as not present or incorrectly installed based on the further sensor unit.

10. The method as claimed in claim 1, characterized in that the particulate sensor unit is identified as not present or incorrectly installed based on the defined threshold values.

11. The method as claimed in claim 1, characterized in that the evaluation is performed periodically in specific operating states of the internal combustion engine.

12. The method as claimed in claim 1, characterized in that the evaluation is performed periodically at specific time intervals and in specific operating states of the internal combustion engine.

13. A device for monitoring a particulate sensor unit arranged in an exhaust region of an internal combustion engine, the device including a temperature sensor located inside the particulate sensor unit determines an internal temperature of the particulate sensor unit, which is compared in an engine control with an exhaust gas temperature, wherein a fault and or a warning signal is/are generated based on a difference between the determined internal temperature of the particulate sensor unit and the exhaust gas temperature using at least one of a further sensor unit, modeled variables, and defined threshold values, wherein the particulate sensor unit monitors the discharge of particulates from the internal combustion engine.

14. The device as claimed in claim 13, characterized in that the particulate sensor unit comprises a temperature sensor in the form of a platinum meander.

15. The device as claimed in claim 13, characterized in that the particulate sensor unit comprises a heating element.

16. The device as claimed in claim 13, characterized in that the particulate sensor unit is a particle sensor.

17. The device as claimed in claim 13, wherein the device performs an on-board diagnosis of an internal combustion diesel engine.

18. The device as claimed in claim 13, characterized in that the fault and or the warning signal is/are generated based on the comparison and the further sensor unit.

19. The device as claimed in claim 13, characterized in that the fault and or the warning signal is/are generated based on the comparison and the modeled variables.

20. The device as claimed in claim 13, characterized in that the fault and or the warning signal is/are generated based on the comparison and the defined threshold values.

* * * * *